United States Patent
Cheon et al.

(10) Patent No.: US 11,446,622 B2
(45) Date of Patent: Sep. 20, 2022

(54) SOCKET-TYPE FLUID DISTRIBUTOR

(71) Applicant: LG CHEM, LTD., Seoul (KR)

(72) Inventors: Joo Young Cheon, Daejeon (KR); Dong Hyun Ko, Daejeon (KR); Jun Han Kang, Daejeon (KR); Sang Jin Han, Daejeon (KR); Hyun Jin Cho, Daejeon (KR); Jae Kwon Jeoung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/274,737

(22) PCT Filed: Aug. 12, 2020

(86) PCT No.: PCT/KR2020/010681
§ 371 (c)(1),
(2) Date: Mar. 9, 2021

(87) PCT Pub. No.: WO2021/060699
PCT Pub. Date: Apr. 1, 2021

(65) Prior Publication Data
US 2021/0387152 A1    Dec. 16, 2021

(30) Foreign Application Priority Data

Sep. 24, 2019 (KR) .......................... 10-2019-0117210
May 27, 2020 (KR) .......................... 10-2020-0063701

(51) Int. Cl.
*B01J 8/06* (2006.01)

(52) U.S. Cl.
CPC ...... *B01J 8/065* (2013.01); *B01J 2208/00548* (2013.01); *B01J 2208/00823* (2013.01);
(Continued)

(58) Field of Classification Search
CPC .... B01J 8/06; B01J 8/065; B01J 2208/00539; B01J 2208/00548; B01J 2208/00823;
(Continued)

(56) References Cited

U.S. PATENT DOCUMENTS 3,482,947 A * 12/1969 Jacobsen ................ B01J 19/247
261/153
2006/0078483 A1    4/2006 Kemoun et al.
(Continued)

FOREIGN PATENT DOCUMENTS

FR    3024054 A1    1/2016
JP    H09-502389 A    3/1997
(Continued)

*Primary Examiner* — Lessanework Seifu
(74) *Attorney, Agent, or Firm* — Dentons US LLP

(57) ABSTRACT

A socket-type fluid distributor for distributing and supplying a gas and/or liquid reactant into a reactor body. The socket-type fluid distributor includes: a distributor body, a bottom portion of which is inserted into the reactor body; a mixing flow path formed in a central portion of the distributor body such that the mixing flow path penetrates through the distributor body into the reactor body; a gas reactant input portion disposed above the distributor body and having a gas flow path; a liquid reactant input portion disposed between the distributor body and the gas reactant input portion and having a liquid flow path; and a flow control portion formed in the mixing flow path.

12 Claims, 2 Drawing Sheets

(52) U.S. Cl.
CPC ............... *B01J 2208/00893* (2013.01); *B01J 2208/00938* (2013.01)

(58) Field of Classification Search
CPC .... B01J 2208/00849; B01J 2208/00893; B01J 2208/00902; B01J 2208/00938; B01J 2208/06
See application file for complete search history.

(56) References Cited

U.S. PATENT DOCUMENTS

| | | | |
|---|---|---|---|
| 2007/0272298 A1* | 11/2007 | Porscha | B01D 53/185 137/263 |
| 2008/0244974 A1 | 10/2008 | Bartolini et al. | |
| 2012/0063961 A1* | 3/2012 | Chan | C10B 55/10 239/398 |
| 2016/0060541 A1 | 3/2016 | Reid et al. | |
| 2017/0216807 A1 | 8/2017 | Raboin | |
| 2019/0176119 A1 | 6/2019 | Niderkorn et al. | |

FOREIGN PATENT DOCUMENTS

| | | |
|---|---|---|
| JP | 2008-522802 A | 7/2008 |
| JP | 2011-098339 A | 5/2011 |
| KR | 10-2015-0080869 A | 7/2015 |
| KR | 10-2017-0025348 A | 3/2017 |
| KR | 10-1732409 B1 | 5/2017 |
| KR | 10-2018-0079318 A | 7/2018 |
| WO | 2016/032671 A1 | 3/2016 |

* cited by examiner

[FIG. 1]
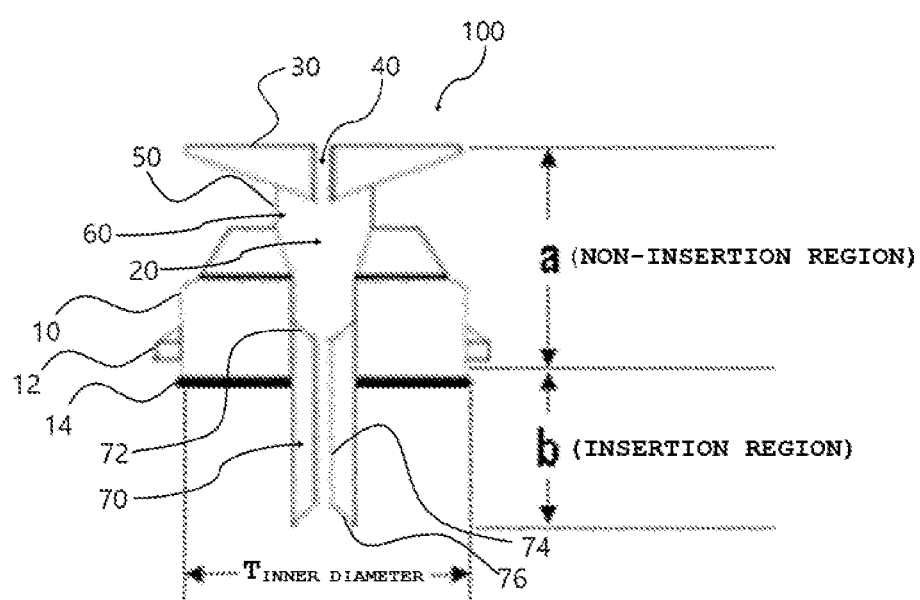

[FIG 2]
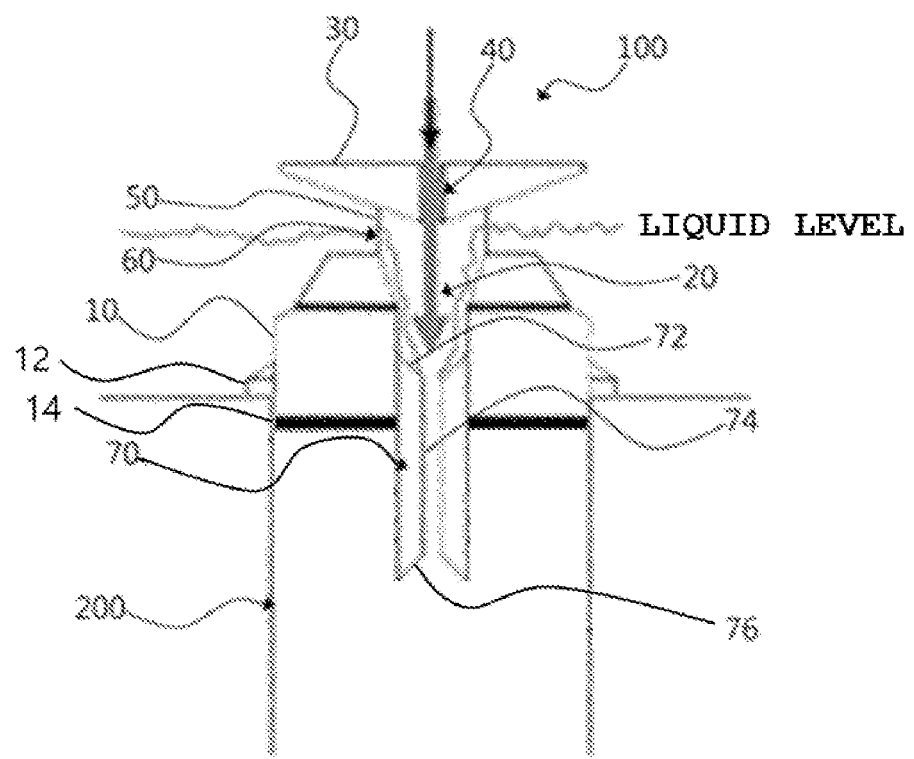

SOCKET-TYPE FLUID DISTRIBUTOR

CROSS-REFERENCE TO RELATED APPLICATIONS

This application is a U.S. national stage of international Application No. PCT/KR2020/010681, filed on Aug. 12, 2020, and claims priority to Korean Patent Application No. 10-2019-0117210, filed on Sep. 24, 2019 and Korean Patent Application No. 10-2020-0063701, filed on May 27, 2020, the entire contents of which are incorporated herein for all purposes by this reference.

TECHNICAL FIELD

The present invention relates to a fluid distributor for distributing and introducing a raw material fluid to a plurality of reactor bodies in a multi-tubular reactor, and more particularly, to a socket-type fluid distributor for a multi-tubular trickle-bed.

BACKGROUND

The design and application of a distributor for a multi-tubular reactor known to date has a form that is determined according to a phase of the reactants introduced into the reactor.

A trickle-bed type reactor is generally a fixed layer reactor having a diameter of a certain size or more, and has a form in which a liquid reactant and a gas reactant are supplied to the reactor. When the reaction carried out in the trickle-bed reactor generates an excessive amount of heat, or when it is necessary to ensure stability in the process operation due to reactivity, a multi-tubular reactor with unit reactors arranged in parallel may be used rather than a single-tubular reactor having a large diameter. An advantage of a multi-tubular reactor is that it provides a large heat exchange area compared to the single-tubular reactor having a large diameter.

However, a problem of such a conventional multi-tubular reactor is that it is difficult to evenly distribute the reactants to each unit reactor. In addition, in the conventional multi-tubular reactor, the liquid reactant overflows when a tray of each layer (step) is filled with the liquid reactant above a certain level, and thus it is difficult to achieve even distribution when a differential pressure occurs due to non-uniformity of a catalyst layer for each unit reactor.

SUMMARY

An objective of the present invention is to provide a socket-type fluid distributor that may be aligned at an accurate position, to offset a differential pressure generated by filling each reactor with catalyst, and supply a mixed reactant to a catalyst layer in the form of a droplet, airflow, or a spray of various sizes according to flow rate ratios of a liquid reactant and a gas reactant.

According to an exemplary embodiment of the present invention, a socket-type fluid distributor for distributing and supplying a gas and/or liquid reactant into a reactor body includes: a distributor body formed in a structure in which a bottom portion of the distributor body is inserted into the reactor body; a mixing flow path formed in a central portion of the distributor body and formed to penetrate through the distributor body; a gas reactant input portion disposed above the distributor body and having a gas flow path formed therein; a liquid reactant input portion disposed between the distributor body and the gas reactant input portion and having a liquid flow path formed therein; and a flow control portion formed in the mixing flow path.

The socket-type fluid distributor may further include a catching protrusion formed on one side of an outer circumferential surface of the distributor body.

The socket-type fluid distributor may further include a sealing portion formed along an outer circumferential surface of a lower end of the distributor body.

The socket-type fluid distributor may include a plurality of distributor bodies provided on the same line.

The gas reactant and the liquid reactant may be mixed in the mixing flow path and may be moved.

In a mixed reactant mixed in the mixing flow path, the form of the mixed reactant supplied to the reactor body may be controlled according to a flow rate of the gas reactant relative to a flow rate of the liquid reactant.

The flow rate of the gas reactant relative to the flow rate of the liquid reactant may be 1 to 100.

The mixed reactant supplied to the reactor body may be in the form of a droplet, airflow, or a spray.

The flow control portion may be configured to increase a pressure of a mixed reactant mixed in the mixing flow path.

The socket-type fluid distributor may include a catalyst filling portion positioned inside the reactor body and filled with solid catalysts, and the flow control portion may be configured such that a pressure of a mixed reactant passing through the flow control portion is greater than a differential pressure generated in the catalyst filling portion.

The flow control portion may include a first inclined portion in which a diameter of the mixing flow path is narrowed along a longitudinal direction of the mixing flow path; a maintaining portion in which the diameter of the mixing flow path is maintained; and a second inclined portion in which the diameter of the mixing flow path is widened.

The first inclined portion may be inclined at an angle of 0° to 90°, a length of the maintaining portion may be 1 mm to 20 mm, and an the second inclined portion may be inclined at an angle of 0° to 90°.

In the socket-type fluid distributor of the present invention, it is possible for the fluid distributor to be aligned at an accurate position because the fluid distributor is inserted into each reactor body provided in the unit reactor of the multi-tubular reactor.

In addition, in the socket-type fluid distributor according to the present invention, the reactant mixed in the fluid distributor may be supplied to the catalyst filling portion in the form of a droplet, airflow, or a spray of a predetermined size or more according to the flow rate ratio of the liquid reactant and the gas reactant because the gas reactant input portion and the liquid reactant input portion are configured separately.

In addition, by configuring a flow control portion of the socket-type fluid distributor according to the present invention to generate a constant flow resistance, the differential pressure caused by catalyst filling that occurs differently for each catalyst filling portion in the reactor body may be offset, thereby eliminating the influence of the differential pressure of the catalyst filling, which causes an uneven distribution of the reactant.

BRIEF DESCRIPTION OF DRAWINGS

FIG. 1 is a schematic illustration of a socket-type fluid distributor according to an exemplary embodiment of the present invention.

FIG. 2 is a schematic illustration of a state in which the socket-type fluid distributor according to an exemplary embodiment of the present invention is inserted into a reactor body.

DETAILED DESCRIPTION

Terms and words used in the description and claims of the present invention are not to be construed as a general or dictionary meaning but are to be construed as meaning and concepts meeting the technical ideas of the present invention based on a principle that the inventor can appropriately define the concepts of terms in order to describe their own invention in best mode.

Hereinafter, a socket-type fluid distributor 100 according to the present invention will be described in more detail with reference to FIGS. 1 and 2 to aid in understanding the present invention.

According to an exemplary embodiment of the present invention, the socket-type fluid distributor 100 is an apparatus for distributing and supplying a gas and/or liquid reactant into a reactor body 200, and may include a distributor body 10 formed in a structure in which a bottom portion of the distributor body is inserted into the reactor body 200; a mixing flow path 20 formed in a central portion of the distributor body 10 and formed to penetrate through the distributor body 10; a gas reactant input portion 30 disposed above the distributor body 10 and having a gas flow path 40 formed therein; a liquid reactant input portion 50 disposed between the distributor body 10 and the gas reactant input portion 30 and having a liquid flow path 60 formed therein; and a flow control portion 70 formed in the mixing flow path 20.

According to an exemplary embodiment of the present invention, the socket-type fluid distributor 100 may be for distributing and supplying gas and/or liquid reactants to the reactor body 200 provided in a unit reactor of a multi-tubular trickle-bed reactor. The multi-tubular trickle-bed reactor may include a plurality of unit reactors, and the unit reactor may include the reactor body 200, and a catalyst filling portion (not illustrated) positioned inside the reactor body 200 and filled with solid catalysts.

The multi-tubular trickle-bed reactor is a downstream catalyst reactor, and in a catalytic process, a raw material fluid made of the gas and/or liquid reactants is introduced into each reactor body 200 provided in the unit reactor, and undergoes a series of chemical reactions while passing through the catalyst filling portion inside the reactor body 200. Accordingly, the socket-type fluid distributor 100 according to the present invention may be installed at the uppermost end of each reactor body 200 provided in the unit reactor of the multi-tubular trickle-bed reactor and serves to distribute and input the gas and/or liquid reactants as the raw material fluid.

In the multi-tubular trickle-bed reactor, the raw material fluid needs to be introduced into a central portion of the uppermost end of the reactor body 200. If the raw material fluid is not introduced into the central portion of the uppermost end of the reactor body 200, the raw material fluid flows along an inner wall of the reactor (wall flow phenomenon) and does not react with the catalyst or reacts with a portion of the catalyst, resulting in a reaction deviation, thereby significantly reducing reaction efficiency.

However, a problem associated with a conventional multi-tubular trickle-bed reactor is that it is difficult to evenly distribute the reactants to each unit reactor. In addition, in the conventional multi-tubular trickle-bed reactor, the liquid reactant overflows when the liquid reactant is filled in a tray of each layer (step) above a certain level, and thus it is difficult to achieve even distribution when a differential pressure occurs due to non-uniformity of catalyst filling for each unit reactor.

On the other hand, it is possible for the fluid distributor to be aligned at an accurate position because the socket-type fluid distributor according to the present invention is configured as a socket-type fluid distributor that may be inserted into and fixed to the reactor body 200 and is inserted into the top of each reactor body 200 provided in the unit reactor of the multi-tubular trickle-bed reactor. Specifically, a partial region of the socket-type fluid distributor 100 according to the present invention is inserted into and fixed to the uppermost end of each reactor body 200 provided in the unit reactor of the multi-tubular trickle-bed reactor, and accordingly, since the reactant may be introduced into the central portion of the uppermost end of the reactor body 200 through the socket-type fluid distributor 100, it is possible to solve the problem that occurs when the reactant flows along the inner wall of the unit reactor when using the conventional fluid distributor.

In addition, the socket-type fluid distributor 100 according to the present invention may solve the difficulty in achieving even distribution of the reactant when the differential pressure occurs due to non-uniformity of catalyst filling for each unit reactor of the conventional multi-tubular trickle-bed reactor through the flow control portion 70 formed in the mixing flow path 20 to be described later.

The socket-type fluid distributor 100 may include a plurality of distributor bodies 10 aligned on a common line so as to be inserted into and fixed to each reactor body 200 provided in the unit reactors of the multi-tubular trickle-bed reactors arranged in parallel. Specifically, the plurality of distributor bodies 10 may be formed at positions corresponding to the unit reactors of the multi-tubular trickle-bed reactors. As long as the distributor body 10 is configured to be inserted into and fixed to the uppermost end of the reactor body 200, there is no limitation on the specific structure and method thereof. For example, an outer diameter of the distributor body 10 may be the same as an inner diameter of the reactor body 200, so that the distributor body 10 may be inserted into and fixed to the uppermost end of the reactor body 200.

In addition, the distributor body 10 may be inserted into and fixed to the upper end of the reactor body 200 at an arbitrary height from a lower end of the distributor body 10. Specifically, at the uppermost end of the reactor body 200, there is an opening for introducing a catalyst, and by inserting and fixing a partial region of the distributor body 10 of the socket-type fluid distributor 100 according to the present invention into and to the opening, the distributor body 10 may be attached to the reactor body 200. As such, the socket-type fluid distributor 100 according to the present invention can be easily attached to the reactor body 200, and the mixing flow path 20 may be positioned in the central portion of the uppermost end of each reactor body 200.

The socket-type fluid distributor 100 may include a catching protrusion 12 formed on one side of an outer circumferential surface of the distributor body 10. The catching protrusion 12 is formed to be caught in the reactor body 200 when the socket-type fluid distributor is inserted into the upper end of the reactor body 200 at an arbitrary height from the lower end of the distributor body 10 to prevent the entirety of the socket-type fluid distributor 100 from being completely inserted into the reactor body 200 along a longitudinal direction.

Specifically, based on the catching protrusion 12, a lower region thereof, that is, insertion region (b), may be a predetermined region into which a bottom portion of the distributor body is inserted into the reactor body 200, and based on the catching protrusion 12, an upper region thereof, that is, non-insertion region (a), may be a predetermined region of the socket-type fluid distributor 100 into which the distributor body is not inserted into the reactor body 200.

The specific structure or size of the distributor body 10 is not limited, but for example, when the distributor body 10 has a form of a cylinder, a ratio ($a/T_{inner\ diameter}$) of a length a of the non-insertion region (a) relative to an inner diameter ($T_{inner\ diameter}$) of the reactor body may be 0.5 to 1, and a ratio ($b/T_{inner\ diameter}$) of a length b of the insertion region (b) relative to the inner diameter ($T_{inner\ diameter}$) of the cylinder may be 0.5 or more and less than 2.

By controlling the value of the $a/T_{inner\ diameter}$ to be within the above-mentioned range, the uniform distribution of the reactant for each unit reactor may be easily achieved by forming a standard for an accumulated permissible amount of the liquid reactant remaining in the reactor body (accumulated liquid volume=total area of cross section of the reactor body*a), and by controlling the value of the $b/T_{inner\ diameter}$ to be within the above-mentioned range, it is possible to offset the differential pressure due to the catalyst filling for each unit reactor being sprayed in a section in which a mixed reactant in which the gas and liquid are mixed.

The insertion region (b) may be inserted into and fixed to the reactor body 200 to be spaced apart from the uppermost end layer of the catalyst filling portion in the reactor body 200, to be in contact with the uppermost end layer of the catalyst filling portion, or to be inserted into the catalyst filling portion.

The distributor body 10 may have a structure that is detachable from the upper end of the reactor body 200. Specifically, in the socket-type fluid distributor 100 according to the present invention, it may be easy to insert the distributor body 10 into the upper end of the reactor body 200 and attach the distributor body 10 thereto, or detach the distributor body 10 from the upper end of the reactor body 200, as necessary. Therefore, it is possible to easily detach the distributor body 10 from the reactor body 200 to exchange the catalyst in the reactor body 200 or wash the reactor body 200.

The socket-type fluid distributor 100 may include a sealing portion 14 formed along an outer circumferential surface of the lower end of the distributor body 10. The sealing part 14 may serve to fix the socket-type fluid distributor 100 to each reactor body 200 provided in the unit reactor of the multi-tubular trickle-bed reactor.

In addition, when the gas reactant and the liquid reactant are supplied to each reactor body 200 provided in the unit reactor of the multi-tubular trickle-bed reactor using the socket-type fluid distributor 100, the sealing portion 14 may serve to airtightly prevent the reactants from moving to a region outside the socket-type fluid distributor 100, that is, a region between the reactor body 200 and the socket-type fluid distributor 100.

According to a preferred embodiment of the present invention, the mixing flow path 20 may be formed in the central portion of the distributor body 10 and may be formed to penetrate through the distributor body 10. As such, in the mixing flow path 20 formed to penetrate through the distributor body 10 in the central portion of the distributor body 10, the gas reactant and the liquid reactant supplied through a gas flow path 40 and a liquid flow path 60 to be described later may be mixed.

A mixed reactant in which the gas reactant and the liquid reactant are mixed in the mixing flow path 20 may move from the top to the bottom of the socket-type fluid distributor 100. Specifically, the gas reactant and the liquid reactant may be mixed in the mixing flow path 20 and flow from the top to the bottom of the socket-type fluid distributor 100, and may be discharged through the lowermost end of the mixing flow path 20 and supplied to the central portion of the reactor body 200.

According to an exemplary embodiment of the present invention, the gas reactant input portion 30 may be disposed above the distributor body 10 and may have the gas flow path 40 formed therein. Specifically, the gas reactant input portion 30 may be formed above the distributor body 10 and the gas flow path 40 may be formed to penetrate through the gas reactant input portion 30 in a central portion of the gas reactant input portion 30.

The gas flow path 40 may be connected to the mixing flow path 20. For example, the gas reactant may flow from top to bottom along the gas flow path 40, and may pass through the gas flow path 40 and be supplied to the mixing flow path 20.

A front end of the gas flow path 40 may include a pipe for supplying the gas reactant to the gas flow path 40, and in supplying the gas reactant to the gas flow path 40, additional apparatuses such as a valve and a pump may be installed to control a supply flow rate of the gas reactant.

A flow rate of the gas reactant supplied through the gas flow path 40 may be 25 ml/min to 5000 ml/min. For example, the flow rate of the gas reactant transferred to the mixing flow path 20 through the gas flow path 40 may be 25 ml/min to 4000 ml/min or 500 ml/min to 3000 ml/min.

As one example, when the flow rate of the liquid reactant supplied to the liquid flow path 60 is fixed at 10 to 25 ml/min, and the flow rate of the gas reactant supplied through the gas flow path 40 is 1000 ml/min to 2500 ml/min, a mixed reactant formed by mixing the gas reactant and the liquid reactant in the mixing flow path 20 may be in the form of a spray.

As another example, when the flow rate of the gas reactant supplied through the gas flow path 40 is 2500 ml/min to 5000 ml/min, the mixed reactant formed by mixing the gas reactant and the liquid reactant in the mixing flow path 20 may be in the form of airflow.

As still another example, when the flow rate of the gas reactant supplied through the gas flow path 40 is 25 ml/min to 1000 ml/min, the mixed reactant formed by mixing the gas reactant and the liquid reactant in the mixing flow path 20 may be in the form of a droplet. When the flow rate of the gas reactant is controlled within the above-mentioned range, a size of the droplet of the mixed reactant may be controlled. For example, when the flow rate of the gas reactant supplied through the gas flow path 40 is 25 ml/min to 250 ml/min, an average size of droplets in the mixed reactant may be 10 $mm^3$ to 17 $mm^3$, when the flow rate of the gas reactant supplied through the gas flow path 40 is 300 ml/min to 500 ml/min, an average size of droplets in the mixed reactant may be 3 $mm^3$ to 10 $mm^3$, and when the flow rate of the gas reactant supplied through the gas flow path 40 is 500 ml/min to 1000 ml/min, an average size of droplets in the mixed reactant may be 0.6 $mm^3$ to 3 $mm^3$.

According to an exemplary embodiment of the present invention, the liquid reactant input portion 50 may be disposed between the distributor body 10 and the gas reactant input portion 30 and may have the liquid flow path 60 formed therein. Specifically, the liquid reactant input portion 50 may be formed at a predetermined height in a region between the distributor body 10 and the gas reactant input portion 30, and the liquid flow path 60 may be formed on an outer surface of the liquid reactant input portion 50.

The liquid flow path 60 is in the form of a plurality of holes at predetermined intervals along the outer surface of the liquid reactant input portion 50, or may be in the form of a pipe connected from the outer surface of the liquid reactant input portion 50 to the mixing flow path 20.

The liquid flow path 60 may be formed at a position lower than a liquid level of the liquid reactant in the multi-tubular trickle-bed reactor to allow the liquid reactant to flow along the liquid flow path 60.

A plurality of liquid flow paths 60 may be formed along the outer surface of the liquid reactant input portion 50. For example, a plurality of the liquid flow path 60 may be formed at a predetermined interval along the outer surface of the liquid reactant input portion 50, and the number of liquid flow paths 60 may be appropriately adjusted according to a flow rate of the liquid reactant supplied to the mixing flow path 20.

The flow rate of the liquid reactant transferred to the mixing flow path 20 through the liquid flow path 60 may be 0.25 ml/min to 250 ml/min. For example, the flow rate of the liquid reactant transferred to the mixing flow path 20 through the liquid flow path 60 may be 0.25 ml/min to 2.5 ml/min, 2.5 ml/min to 50 ml/min, or 50 ml/min to 250 ml/min.

According to an exemplary embodiment of the present invention, a flow rate of the gas reactant supplied through the gas flow path 40 relative to the flow rate of the liquid reactant supplied through the liquid flow path 60 may be 1 to 100. For example, the flow rate of the gas reactant relative to the flow rate of the liquid reactant may be 10 to 100, 20 to 100, or 40 to 100. By controlling the flow rate of the gas reactant relative to the flow rate of the liquid reactant to be within the above-mentioned range, the mixed reactant formed by mixing the gas reactant and the liquid reactant in the mixing flow path 20 may be adjusted to be in the form of a spray, airflow, or a droplet according to demand.

As such, by separately configuring the gas reactant input portion 30 and the liquid reactant input portion 50, the mixed reactant mixed in the mixing flow path 20 inside the socket-type fluid distributor 100 may be supplied to each reactor body 200 of the unit reactors of the multi-tubular trickle-bed reactor in the form of a droplet, airflow, or a spray of a predetermined size or more according to the flow rate of the gas reactant relative to the flow rate of the liquid reactant.

According to an exemplary embodiment of the present invention, the flow control portion 70 may be formed in an arbitrary region of the mixing flow path 20 and may be configured to increase a pressure of the mixed reactant in which the gas reactant and the liquid reactant are mixed in the mixing flow path 20.

The flow control portion 70 may be configured such that the pressure of the mixed reactant passing through the flow control portion 70 is greater than the differential pressure generated in the catalyst filling portion (not illustrated). Specifically, in the multi-tubular trickle-bed reactor, when the catalyst is filled in each reactor body 200 in the plurality of unit reactors, the differential pressure caused by the different amounts of catalyst filling each catalyst filling portion. Specifically, when the catalyst filling portion is filled with the catalyst, the differential pressure occurs due to flow resistance to a stream passing through the catalyst filling portion. In addition, the differential pressure occurs because of a minute difference in size of the catalysts included in the catalyst filling portion or the density, shape, and the like. In addition, in the socket-type fluid distributor according to the present invention, by configuring the pressure of the mixed reactant to be greater than the differential pressure generated in the catalyst filling portion, the differential pressure caused by catalyst filling that occurs differently for each catalyst filling portion may be offset, thereby eliminating the influence of the differential pressure of the catalyst filling, which causes an uneven distribution of the reactant.

The flow control portion 70 may include a first inclined portion 72 in which a diameter of the mixing flow path 20 is narrowed along a longitudinal direction of the mixing flow path 20; a maintaining portion 74 in which the diameter of the mixing flow path 20 is maintained; and a second inclined portion 76 in which the diameter of the mixing flow path is widened.

Specific values, such as an angle of the first inclined portion 72, a length of the maintaining portion 74, and an angle of the second inclined portion 76 may be set such that a pressure increase in the pressure of the mixed reactant passing through the flow control portion 70 is large enough to offset the differential pressure due to catalyst filling. According to an angle adjustment of the first inclined portion 72 and the second inclined portion 76 and the length of the maintaining portion 74, the flow control portion 70 of various shapes may be formed.

The first inclined portion 72 may be inclined at an angle of 0° to 90°, the length of the maintaining portion 74 may be 1 mm to 20 mm, and the second inclined portion 76 may be inclined at an angle of 0° to 90°.

For example, the first inclined portion 72 may be inclined at an angle of 10° to 90°, 30° to 90°, or 30° to 45°. By adjusting the inclination angle of the first inclined portion 72 to be within the above-mentioned range, artificial flow resistance may be generated at the front end of the mixing flow path 20.

In addition, the length of the maintaining portion 74 may be 1 mm to 15 mm, 5 mm to 15 mm, or 10 mm to 15 mm. By adjusting the length of the maintaining portion 74 to be within the above-mentioned range, flowability of the mixed reactant may be controlled.

In addition, the second inclined portion 76 may be inclined at an angle of 10° to 90°, 30° to 90°, or 30° to 45°. By adjusting the inclination angle of the second inclined portion 76 to be within the above-mentioned range, a difference in scattering of a gas and liquid mixture phase may be achieved after the mixed reactant passes through the mixing flow path 20.

The above description is merely illustrative of the technical concept of the present invention, and those skilled in the art to which the present invention pertains may make various modifications and changes without departing from the essential characteristics of the present invention. Therefore, the exemplary embodiments disclosed in the present invention are not intended to limit the technical idea of the present invention, but to explain the technical idea, and the scope of the technical idea of the present invention is not limited by these exemplary embodiments. The scope of protection of the present invention should be interpreted by the following claims, and all technical ideas within the scope equivalent thereto should be interpreted as being included in the scope of the present invention.

The invention claimed is:

1. A socket-type fluid distributor for distributing and supplying a gas and/or liquid reactant into a reactor body, the socket-type fluid distributor comprising:
    a distributor body, wherein a bottom portion of the distributor body is inserted into the reactor body;
    a mixing flow path formed in a central portion of the distributor body, wherein the mixing flow path penetrates through the distributor body into the reactor body;
    a gas reactant input portion disposed above the distributor body, wherein the gas reactant input portion comprises a gas flow path formed therein;
    a liquid reactant input portion disposed between the distributor body and the gas reactant input portion, wherein the liquid reactant input portion comprises a liquid flow path formed therein;
    a flow control portion formed in the mixing flow path, and
    a catalyst filling portion positioned inside the reactor body and filled with solid catalysts,
    wherein the flow control portion is configured such that a pressure of a mixed reactant passing through the flow control portion is greater than a differential pressure generated in the catalyst filling portion.

2. The socket-type fluid distributor of claim 1, further comprising a catching protrusion formed on one side of an outer circumferential surface of the distributor body.

3. The socket-type fluid distributor of claim 1, further comprising a sealing portion formed along an outer circumferential surface of a lower end of the distributor body.

4. The socket-type fluid distributor of claim 1, wherein the socket-type fluid distributor comprises a plurality of distributor bodies aligned along a common line.

5. The socket-type fluid distributor of claim 1, wherein the gas reactant and the liquid reactant are mixed in the mixing flow path and are moved from a top to a bottom of the socket-type fluid distributor.

6. The socket-type fluid distributor of claim 1, wherein a flow rate of the gas reactant relative to a flow rate of the liquid reactant is 1 to 100 to control a form of a mixed reactant mixed in the mixing flow path and supplied to the reactor body.

7. The socket-type fluid distributor of claim 6, wherein the flow rate of the liquid reactant is 0.25 ml/min to 250 ml/min.

8. The socket-type fluid distributor of claim 1, wherein the flow control portion is configured to increase a pressure of a mixed reactant mixed in the mixing flow path.

9. The socket-type fluid distributor of claim 1, wherein the flow control portion includes:
    a first inclined portion in which a diameter of the mixing flow path is narrowed along a longitudinal direction of the mixing flow path;
    a maintaining portion in which the diameter of the mixing flow path is maintained at a narrowest diameter of the first inclined portion; and
    a second inclined portion in which the diameter of the mixing flow path is widened from an initial diameter that is the same as the narrowest diameter of the first inclined portion.

10. The socket-type fluid distributor of claim 9, wherein the first inclined portion is inclined at an angle of 0° to 90°, a length of the maintaining portion is 1 mm to 20 mm, and the second inclined portion is inclined at an angle of 0° to 90°.

11. The socket-type fluid distributor of claim 1, wherein the distributor body is a cylinder.

12. The socket-type fluid distributor of claim 11, wherein a length ratio ($a/T_{inner}$ diameter) of a length a of a portion of the distributor body, which is not inserted into the reactive body, relative to an inner diameter ($T_{inner}$ diameter) of the reactor body is 0.5 to 1, and a length ratio ($b/T_{inner}$ diameter) of a length b of the bottom portion of the distributor body inserted into the reactor body relative to the inner diameter ($T_{inner}$ diameter) of the cylinder is 0.5 or more and less than 2.

* * * * *